June 17, 1924.

H. O. MAINZINGER 1,497,761

ATTACHABLE SMOOTH TREAD FOR CLEATED TRACTION WHEELS

Filed June 25, 1923

Inventor
Harry O. Mainzinger

By

Attorneys

Patented June 17, 1924.

1,497,761

UNITED STATES PATENT OFFICE.

HARRY O. MAINZINGER, OF RIVER ROUGE, MICHIGAN, ASSIGNOR TO WHITEHEAD & KALES COMPANY, OF RIVER ROUGE, MICHIGAN, A CORPORATION OF MICHIGAN.

ATTACHABLE SMOOTH TREAD FOR CLEATED TRACTION WHEELS.

Application filed June 25, 1923. Serial No. 647,725.

*To all whom it may concern:*

Be it known that I, HARRY O. MAINZINGER, a citizen of the United States of America, residing at River Rouge, in the county of Wayne and State of Michigan, have invented certain new and useful Improvements in Attachable Smooth Treads for Cleated Traction Wheels, of which the following is a specification, reference being had therein to the accompanying drawings.

The invention relates to protecting treads for cleated traction wheels adapted for use when the tractor is to be driven over a road or pavement which might be otherwise injured by the cleats of the wheel.

It is the object of the invention to obtain a construction which lessens the labor of attaching or detaching the tread and one which may be quickly applied or removed, which is securely fastened while in engagement with the wheel and which thoroughly guards against injury by the cleats.

Figure 1:
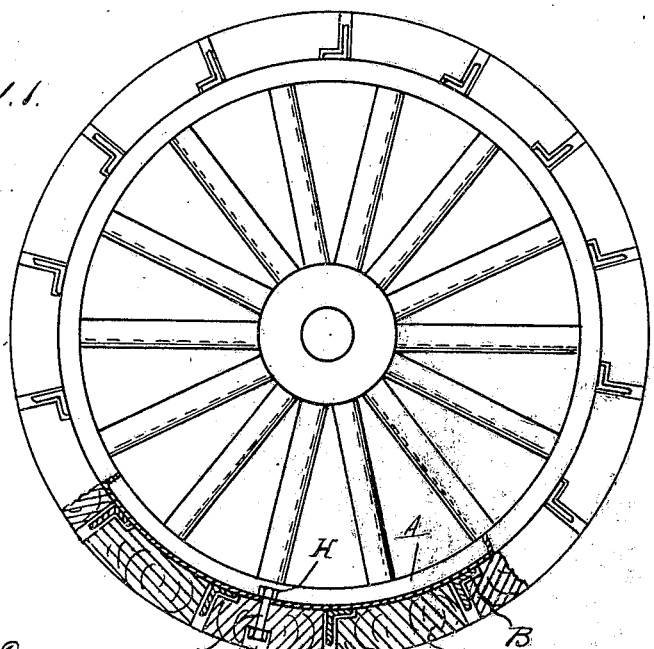
Figure 1 is a sectional side elevation of a cleated traction wheel to which my improvement is applied.
Figure 2:
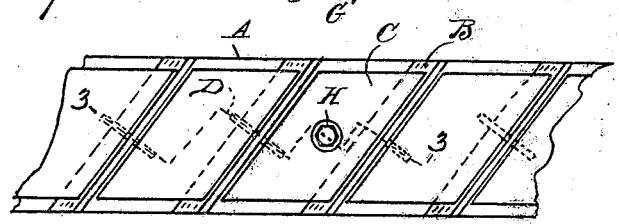
Figure 2 is a plan view showing the portion of the cleated rim in the manner of securing the tread blocks thereto.
Figure 3:
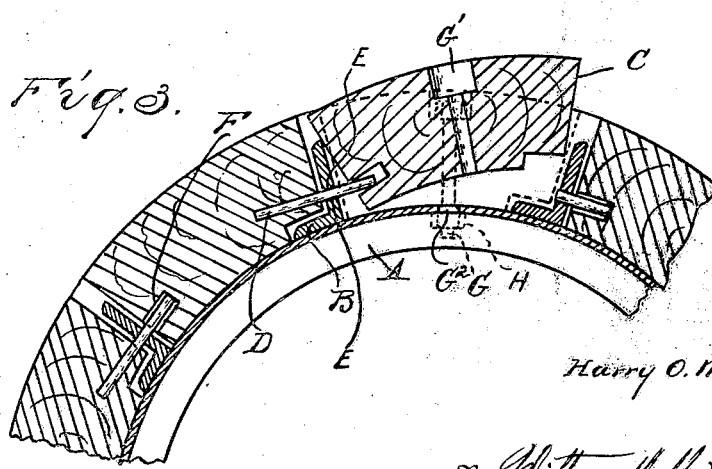
Figure 3 is a section on line 3—3 of Fig. 2.

A represents the rim of a tractor wheel of any suitable construction and which is provided with the usual cleats B extending obliquely across the rim of the wheel. These cleats as shown are formed of angle bars and are riveted or otherwise secured to the rim.

My improved attachable tread comprises a series of filler blocks C, which are insertable in the spaces between adjacent cleats and which are of a thickness somewhat greater than the depth of the cleats, so as to hold the latter from contact with the roads or pavements. The blocks C are preferably formed of wood and are provided with attachment means such that they may be individually engaged or disengaged from the wheel. This greatly lessens the labor over that required for any tread unit in which all of the filler blocks must be simultaneously applied.

The means which I preferably employ for securing these filler blocks comprises a dowel engagement between each block and the adjacent block which passes through the intermediate cleat. As shown, each block is provided at a point adjacent to the central plane of the rim with a dowel pin D projecting laterally therefrom and which passes through an aperture E in the cleat B and into a bore or recess F in the adjacent block C. Sufficient clearance is provided in the bore F to permit of the angular arrangement of the cleat necessary in entering the dowel pin and clearing the adjacent cleat. The dowel pins D preferably extend perpendicular to the cleat and therefore at an angle to the plane of the wheel. Each filler block may thus be successively engaged until the last one of the series is reached. This obviously cannot be secured by a similar dowel, as there would be no means for either simultaneously or successively engaging dowels on opposite edges of the block with the adjacent cleats. However, I have provided a securing means comprising a bolt G, which engages a central countersunk bore G' in the block and through an aperture $G^2$ in the rim engaging a nut H on the inner side of the rim. This bolt will secure the end cleat while all of the rest of the cleats are held in place by the dowels.

With the construction described, assuming that the user of the tractor desires to drive the same along a road or pavement from one field to another, he can successively engage the blocks by means of the dowels, and, after securing the end blocks with the bolt G, the whole series is held in engagement with the rim. As the thickness of the filler blocks is greater than the depth of the cleats, the latter will be held out of contact with the pavement and a substantially smooth periphery is provided for the wheel. When the machine is again to be used for traction, the blocks may be easily removed and may be stored in any convenient location.

What I claim as my invention is:

1. The combination with a cleated traction wheel, of a protecting tread therefor comprising a series of separate filler blocks for the spaces intermediate adjacent cleats, and a dowel engagement between adjacent filler blocks and the intermediate cleat.

2. The combination with a cleated traction wheel, of a protecting tread therefor comprising a series of filler blocks for the spaces between adjacent cleats, a dowel projecting from each block insertable through a registering aperture in the adjacent cleat and into a registering aperture in the adjacent filler block, and means for detachably securing the end block of the series to the rim of the wheel and an adjacent cleat.

3. The combination with a cleated traction wheel, of a projecting tread therefor comprising a series of filler blocks for the spaces between cleats, dowels projecting laterally from each block and engageable with registering apertures in the adjacent cleat and block, and securing means for the end block of the series comprising a clamping bolt extending through an aperture in said end block, and a registering aperture in the rim.

4. The combination with a traction wheel having a series of diagonally extending cleats attached thereto, of a protecting tread for said wheel comprising a series of filler blocks for the spaces between adjacent cleats, dowels projecting from one edge to each block through a registering aperture in the adjacent cleat and into a registering aperture in the adjacent block to lock both of said blocks to the cleat, and a clamping bolt for securing the end block of the series.

5. The combination with a traction wheel having a series of diagonally arranged cleats thereon, of a protecting tread therefor comprising a series of filler blocks having two sides respectively substantially parallel to the adjacent cleats and the other two sides parallel with the plane of the wheel, dowel pins projecting from each block perpendicular to the cleat and passing through a central aperture therein and a registering aperture in the adjacent block, and a clamping bolt for securing the end block of the series passing through registering apertures in said block and the rim.

6. The combination with a traction wheel having a rim and a series of cleats thereon, of a protecting tread for said cleats comprising a series of filler blocks for the space between adjacent cleats, dowels engaging the blocks and intermediate cleats, and means engaging the rim of said wheel for securing the end block of the series thereto.

In testimony whereof I affix my signature.

HARRY O. MAINZINGER.